(12) United States Patent
Hoenicka et al.

(10) Patent No.: US 11,333,481 B2
(45) Date of Patent: May 17, 2022

(54) DEVICE AND SENSOR FOR CONTACTLESS DISTANCE AND/OR POSITION DETERMINATION OF A MEASUREMENT OBJECT

(71) Applicant: MICRO-EPSILON MESSTECHNIK GMBH & CO. KG, Ortenburg (DE)

(72) Inventors: Reinhold Hoenicka, Ortenburg (DE);
Tobias Schopf, Bad Birnbach (DE);
Jakob Stieß, Fürstenzell (DE)

(73) Assignee: MICRO-EPSILON MESSTECHNIK GMBH & CO. KG, Ortenburg (DE)

( * ) Notice: Subject to any disclaimer, the term of this patent is extended or adjusted under 35 U.S.C. 154(b) by 0 days.

(21) Appl. No.: 15/755,442

(22) PCT Filed: Aug. 12, 2016

(86) PCT No.: PCT/DE2016/200376
§ 371 (c)(1),
(2) Date: Feb. 26, 2018

(87) PCT Pub. No.: WO2017/045675
PCT Pub. Date: Mar. 23, 2017

(65) Prior Publication Data
US 2018/0245906 A1    Aug. 30, 2018

(30) Foreign Application Priority Data
Sep. 15, 2015    (DE) ............... 10 2015 217 625.8

(51) Int. Cl.
*G01B 7/00* (2006.01)
*G01D 5/20* (2006.01)
*G01B 7/02* (2006.01)

(52) U.S. Cl.
CPC ............. *G01B 7/003* (2013.01); *G01B 7/023* (2013.01); *G01D 5/202* (2013.01)

(58) Field of Classification Search
CPC ........ G01B 7/003; G01B 7/023; G01D 5/202; G01D 11/245
See application file for complete search history.

(56) References Cited

U.S. PATENT DOCUMENTS 4,356,732 A * 11/1982 Hachtel .................. G01L 3/105
                                                            336/30
4,864,295 A    9/1989 Rohr
(Continued)

FOREIGN PATENT DOCUMENTS

CN    1708671 A    12/2005
DE    4016434    11/1991
(Continued)

OTHER PUBLICATIONS

Regulations on the Maintenance and Management of Agricultural Machinery—Implementation and maintenance, safety supervision of agricultural machinery, agricultural machinery troubleshooting and accident accountability practice book, Agricultural Science and Technology Press, pp. 107-109, Jun. 2006.

*Primary Examiner* — Son T Le
*Assistant Examiner* — Dustin R Dickinson
(74) *Attorney, Agent, or Firm* — Jason P. Mueller; FisherBroyles, LLP

(57) ABSTRACT

1. A device for the contactless distance and/or position determination of a measurement object (1), with an electrically conductive measurement object (1) and with a sensor (3) operating in particular according to the inductive, capacitive or the eddy current principle, wherein the sensor (3) comprises a measurement device (4), characterized in that the measurement device (4) is formed by at least two measurement elements (5, 5', 5") which are spatially separated from each other. Moreover, a corresponding sensor (3) is indicated.

13 Claims, 7 Drawing Sheets

(56) References Cited

U.S. PATENT DOCUMENTS

Figure 1:
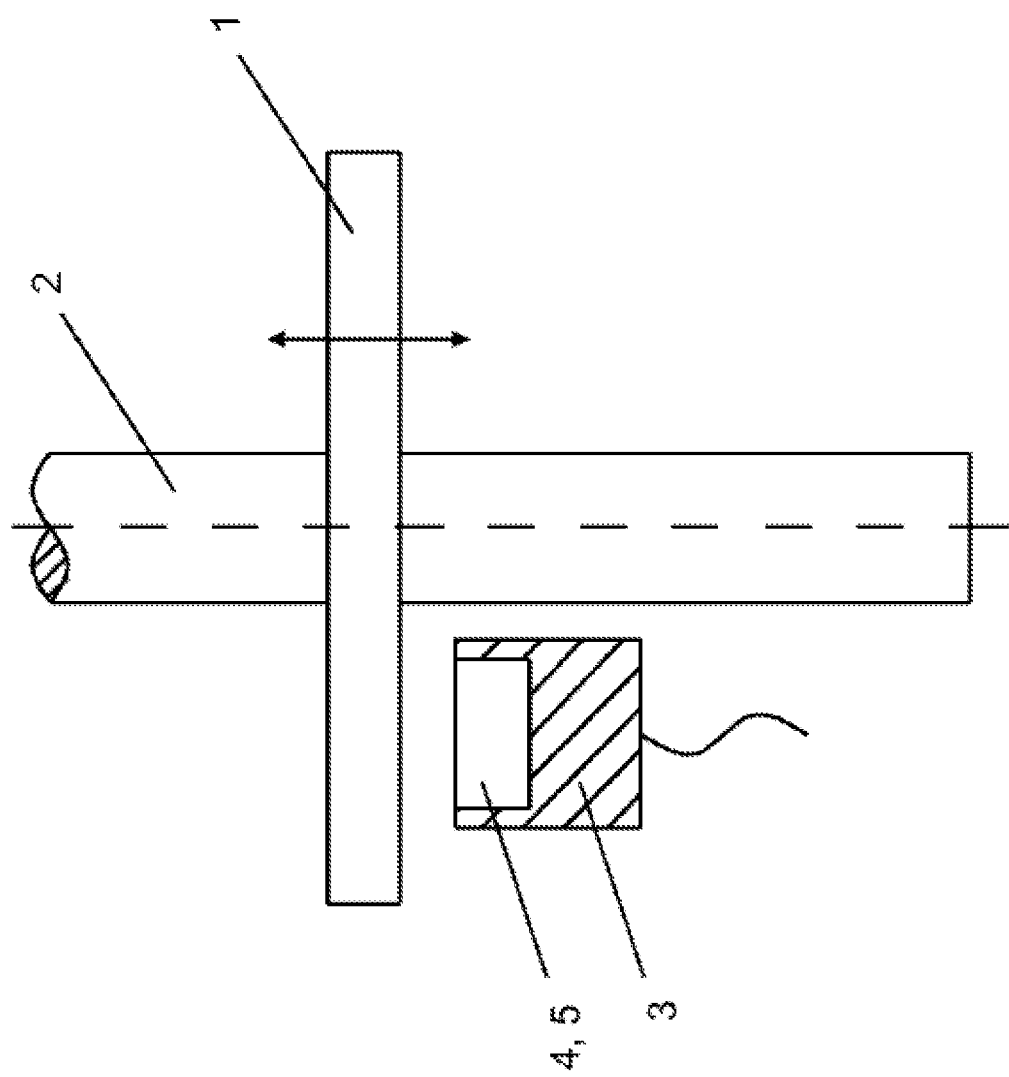

| | | | |
|---|---|---|---|
| 6,107,794 A | 8/2000 | Kipp et al. | |
| 2002/0189123 A1* | 12/2002 | Denzel | G01B 7/003 |
| | | | 33/706 |
| 2003/0080728 A1* | 5/2003 | Daalmans | G01P 3/49 |
| | | | 324/164 |
| 2004/0075452 A1 | 4/2004 | Hrubes | |
| 2005/0253576 A1 | 11/2005 | Nyce | |
| 2006/0096396 A1 | 5/2006 | Harazin et al. | |
| 2011/0304345 A1 | 12/2011 | Hrubes | |
| 2012/0299585 A1* | 11/2012 | Hoenicka | G01B 7/003 |
| | | | 324/207.15 |
| 2013/0314077 A1* | 11/2013 | Okada | G01B 7/14 |
| | | | 324/207.12 |
| 2013/0328455 A1* | 12/2013 | Wu | F16C 32/0476 |
| | | | 310/68 B |
| 2014/0103944 A1* | 4/2014 | Hermann | B23K 26/36 |
| | | | 324/686 |
| 2016/0076913 A1* | 3/2016 | Bonicci | G01D 5/2006 |
| | | | 324/207.17 |
| 2016/0287804 A1* | 10/2016 | Madsen | B29C 45/14639 |
| 2016/0356629 A1* | 12/2016 | Tiapkin | G01D 5/2415 |

FOREIGN PATENT DOCUMENTS

| | | |
|---|---|---|
| DE | 4239635 | 5/1994 |
| DE | 102004033691 | 2/2005 |
| EP | 1281936 | 2/2003 |
| EP | 2690411 | 1/2014 |
| GB | 2136580 | 9/1984 |
| JP | H1-65722 U | 1/1991 |
| JP | 2004526971 A | 9/2004 |
| JP | 2004325109 A | 11/2004 |
| JP | 2012168205 A | 9/2012 |
| JP | 2015092176 A | 5/2015 |

\* cited by examiner

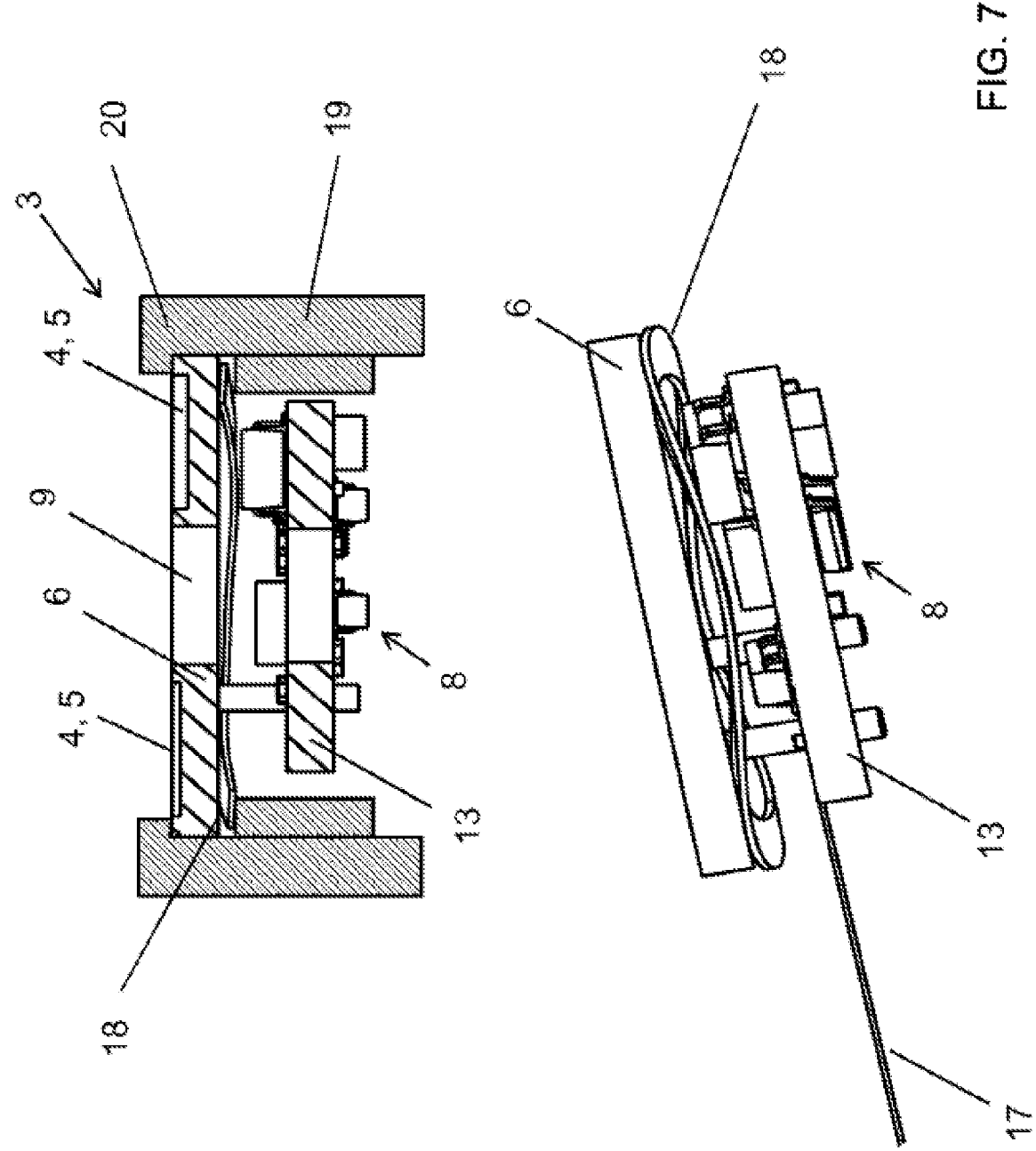

DEVICE AND SENSOR FOR CONTACTLESS DISTANCE AND/OR POSITION DETERMINATION OF A MEASUREMENT OBJECT

The invention relates to a device for the contactless distance and/or position determination of a measurement object, with an electrically conductive measurement object and with a sensor operating in particular according to the inductive, capacitive or the eddy current principle, wherein the sensor comprises a measurement device. Furthermore, the invention relates to a corresponding sensor.

Positioning elements for the path/position (actors) are very frequently operated in closed control circuits. In order to make this possible, a sensor is required to detect the positioning path (or the distance/position/deflection. To this end there are a number of measuring methods (optical, electromagnetic, tactile) which represent the prior art.

Many applications are based on the problem of constructing the actor/sensor system as compactly as possible. In practice, a shaping of the construction shape frequently results in which an axial movement of a cylinder/piston/needle/rod/striker is carried out by the positioning element. Since an axial, direct determination of the movement is not possible due to limitations of construction space, a target flag is frequently placed and arranged in such a manner that a lateral placing of the sensor is possible.

This is shown, for example, in the German published, unexamined document DE 42 39 635 A1. In it, an electrically conductive metallic element is attached to the valve rod in an electropneumatic positioning regulator. A laterally attached path sensor detects the axial movement of the metallic element and therefore the position of the valve rod.

In practice, in the case of electromagnetic sensors (eddy current, capacitive) there is the problem of a disturbing interaction (in addition to the desired interaction with the target) with the deflected mechanism on account of the spatial expansion of the electrical or magnetic field. There is the problem that in the case of a required measuring area a laterally arranged field-bound, contactless sensor generates a field which is spatially too expanded. The expanding field is disturbed by other moved or static objects of the actor in the vicinity, which leads to measuring errors. A reduction in the construction size of the sensor reduces the measuring area so that this is not a satisfactory solution of this problem.

Another problem which occurs in sensors which are laterally arranged in accordance with the prior art is caused by the superposed movements which frequently occur in practice. That is, the movement of the target to the sensor takes place not only axially but is also characterized, for example, as a tilting movement. This can result in significant measurement errors.

This problem is solved according to the prior art by the arranging of several sensors. In DE 42 39 635 A1 two sensors offset by 180° are arranged to this end wherein the sensors measure relative to an oblique plane. However, this results in greater construction expense and therefore in an elevation of costs. Another problem of the laterally arranged sensors is the great space requirement in the longitudinal direction.

The present invention is therefore based on the problem of designing and further developing a generic device for the contactless distance and/or position determination of a measurement object in such a manner that a compact and economical device can be realized with simple constructive means which makes possible a precise distance and/or position determination. Moreover, a corresponding sensor should be indicated.

The above problem is solved in accordance with the invention by the features of claim 1. Accordingly, the device in question for the contactless distance and/or position determination of a measurement object is characterized in that the measurement device is formed by at least two measurement elements which are spatially separate from one another.

It was recognized in accordance with the invention that the basic problem can be solved in a surprisingly simple manner by a skillful designing of the measurement device. This concerns in the case of the measurement device the component of the sensor which generates the electrical, magnetic or electromagnetic field required for the measuring. In principle, a large measurement element, namely, the measurement device, is divided into several smaller measurement elements each of which, viewed by itself, has a smaller construction size and therefore a smaller field distribution than a large measurement element. As a result of the division, the measurement elements can be skillfully geometrically arranged in order to nevertheless achieve a large measuring area. Another advantage is that the scatter field of the measurement elements is reduced, which reduces the outside influencing. Even a tilting of the measurement object can be compensated by a symmetrical arrangement of the measurement elements. The device can comprise at least two, preferably three measurement elements which are spatially separated from one another and jointly form the measurement device. In general, any desired number n of measurement elements can be arranged which jointly form the measurement device. The measurement elements can be supplied by a common measurement electronic system or evaluation electronic system.

In order to realize an especially simple and compact device, the measurement elements can be arranged on a common substrate. Substrate denotes in the following every type of carrier material for measurement elements or electronic components (e.g., printed circuit board, ceramics, multilayer ceramics). In another advantageous manner the measurement elements are arranged in a plane.

The sensor can operate as an inductive or eddy current path sensor. The measurement device can be a coil which is divided into several measurement elements realized as (partial) coils. The (partial) coils can be connected in series so that their inductivity is added. The (partial) coils can be constructed as wound coils or as flat coils. When designed as flat coils, they can be constructed, for example, on printed circuit boards or on ceramic substrates. Alternately, the (partial) coils can be constructed in multilayer ceramic layers which can be produced with the Low Temperature Cofired Ceramics Technology (LTCC Technology) or in High Temperature Cofired Ceramics Technology (HTCC Technology). The coils in LTCC or HTCC technology are especially advantageous since multilayer coils with high inductivity and a small construction size can be produced with them. Moreover, the (partial) coils form a unit with the substrate and the interconnection of the (partial) coils can already be realized in this unit. The coils of the inductive or eddy current path sensor can be part of evaluation electronics which evaluates the amplitude, frequency and/or the phase. A combination of two or three of these magnitudes can also be used.

Furthermore, it is conceivable that the sensor is designed as a capacitive (path) sensor. The measurement device is then a metallic surface which acts in a known manner as an electrode of a plate capacitor. The measurement object serves as counterelectrode so that this measurement electrode and the measurement object form a plate capacitor. The measurement electrode, i.e., the measurement device, can be subdivided into several partial surfaces, i.e., measurement elements which are for their part arranged spatially separated from each other. The (partial) electrodes or measurement elements can be connected in parallel so that the capacity of the (partial) electrodes is added up. The latter can be controlled by common evaluation electronics. The (partial) electrodes can be arranged, for example, on printed circuit boards, on ceramic substrates or in multilayer ceramic layers produced in LTCC or in HTCC technology. Moreover, the (partial) electrodes can form a unit with the substrate and the interconnection of the (partial) electrodes can already be realized in this unit.

A special advantage of the arrangement of the invention according to claim 1 is the fact that a single evaluation electronic system can be used for several measurement elements. The evaluation electronic system can serve the higher-ordered measurement elements and consider them as a unit. Therefore, construction space and expense are saved and the development of heat/energy consumption are minimized. Another advantage resides in the possibility of the same-phase and same-frequency control of the individual measurement elements, as a result of which measurement errors due to the interaction between the measurement elements are avoided. The multipartite measurement element is nevertheless not a classic bridge circuit. A bridge circuit would require a tapping between the measurement elements and is only suitable for the evaluation of differential signals. For example, in the case of a half-bridge arrangement the signal is amplified in one measurement element and attenuated in the other one so that a measurement signal results from the difference of the partial signals. On the other hand, in the arrangement according to the invention all measurement elements act in the same direction so that the partial signals are summed up and the measurement signal is amplified. An electrical tapping between the partial elements does not take place. Another advantage is the fact that in contrast to a classic Wheatstone bridge circuit with four electrical tappings, only two electrical tappings are required, namely, one supply line and one drain line for the coil or the electrode. The evaluation electronics can be built up purely with analog components, from which an analog measuring signal is generated. Alternatively, a digital electronics can be used which supplies digitized signals, for example, a PWM signal, as evaluation electronics. If a microcontroller is used, a digital signal can also be made available, for example, via a bus interface.

Since the measurement elements can function as a cumulative circuit, disturbances such as, e.g., the influence of temperature on the measuring elements or the measuring device are not automatically compensated. Therefore, the measurement element can be loaded with a direct voltage, namely, for the determination of the temperature as a separate temperature compensation. The direct current impedance of the measurement element is proportional to the ohmic resistance, which is a function of the temperature. Therefore, a temperature compensation of the path sensor can be achieved in the evaluation electronics. A compensation of the influence of temperature gradients can also be achieved by the cumulative circuit of the measurement elements. Temperature gradients occur when the temperature on one side of the measurement element is different than on another side. A temperature distribution is adjusted by the measurement element which leads to locally different temperature errors. As a result of the measuring of the direct current impedance of the entire multipartite measurement element, the (local) direct current impedance can be added up at any position and therefore the influence of the temperature gradient can be compensated over the entire measurement element. Alternatively, a temperature sensor can be arranged on the substrate or several temperature sensors can be arranged on different positions of the substrate for temperature compensation.

The evaluation electronics for the path sensor can be directly arranged on the substrate which carries the measurement elements. An especially compact structural shape can be achieved if the evaluation electronics is attached to the back side, i.e., the substrate side facing away from the measurement elements. Alternatively, the evaluation electronics can also be arranged on a preferably annular, separate substrate. The electrical connection of the measurement elements to the evaluation electronics can take place, for example, via rigid contact pins which represent at the same time a mechanical connection and therefore a fixing. The evaluation electronics in the measurement elements form a compact unit here which can be built in as its own object inside the actor. This can save the sensor from having to have its own housing.

Also, the electrical connection between the evaluation electronics in the measurement elements and/or the supplying of the supply voltage to the measurement elements could take place via a flexible conductor. A rigid flexible connection is especially advantageous in which the flexible conductor is embedded in the substrate. Therefore, a mechanical decoupling can be achieved in applications in which, for example, elevated shock or vibration stresses occur on account of the insertion situation. The evaluation electronics can be arranged in this embodiment in an area in which only a low or no stress acts on the structural elements whereas the measurement device or the measurement elements is/are decoupled at the measurement position with shock and vibration stress. Since the measurement device and/or the measurement elements can only comprise printed conducting tracks or electrode surfaces, the device is extremely insensitive to such stresses. If the evaluation electronics is already arranged on the back side of the substrate, the supplying of the supply voltage and the removal of the sensor signals, for example by flexible conductors, contact pins, cables or other electrical connections can also take place.

The measurement device and/or the measurement elements are arranged in an active connection with a measurement object. The measurement object is electrically conductive and can be an integral component of the moved object (for example, of an actor or positioning element) whose deflection/position/distance is to be measured. However, it can also be attached to the moved object especially for the purpose of measuring. If the distance of the measurement object to the path sensor changes, the inductivity and the capacitance of the measurement elements changes. The change of inductivity or capacitance can be converted in the evaluation electronics into an analog or digital signal which is proportional to the deflection/position/distance of the moved object. Concretely speaking, the measurement elements can be arranged on a common side opposite the measurement object and the deflection/shifting/position of the measurement object can be measured in a direction of movement which is directed substantially vertically to the surface of the measurement elements.

An especially favorable arrangement of the measurement elements in an actor is realized if the measurement elements are concentrically arranged around the positioning element. In addition, it is conceivable that the substrate carrying the measurement elements has a passage for a movable object, for example an actor or a positioning element. In particular, the substrate can be constructed in an annular manner and/or the measurement elements and/or the measurement elements can detect all the movement/position/deflection of the measurement object in the common measurement axis (axially). The spatial middle point of the measurement axis is in this case congruent with the middle of the movement axis of the positioning element. The positioning element can be, for example, the piston of a cylinder or the needle or the shaft of a microvalve, a rotating shaft or a rod of a pneumatic positioning drive. In the case of the concentric arrangement around the passage and therefore the positioning element, the available construction space can be optimally utilized. It is not necessary here that the measurement elements have a round shape. The shape of the measurement elements can be adapted to the geometry of the positioning element and/or of the electrically conductive measurement object arranged on the positioning element. For example, the measurement elements can have a geometry which is round, in the shape of a segment of a circle, oval or polygonal, in particular triangular or rectangular. In the case of (partial) coils, only a certain basic inductivity must be achieved.

An especially favorable assembly type is achieved in that the sensor and/or the substrate is pressed with the aid of a resilient element against a fixed structural component of the actor housing, for example, an edge which serves as a firm stop. This is especially advantageous in the case of changing temperature conditions. If the different materials in the actor-sensor unit expand differently, mechanical stresses can arise which either damage the sensor or the actor or lead to false measurement values. This is reduced or excluded by the resilient assembly position and it is ensured that the substrate with the measurement elements is always in a fixed position relative to the actor and therefore to the measurement object. In the case of a round substrate the resilient element can be designed, for example, as a plate spring or a corrugated washer. However, even other resilient (elastic) elements can be used, for example even a suitable polymer, plastic, etc. A three-point support is favorable, which avoids a mechanically overdetermined system.

The basic problem is furthermore solved by a sensor according to claim 15. This sensor is characterized in that the measurement device is formed by at least two measurement elements which are spatially separate from one another.

In order to avoid repetitions, reference is made regarding the design of the sensor according to the invention to the previous comments regarding the device of the invention and of the sensor realized in this device. The construction features of the sensor formed in the device according to the invention according to claim 1 can be expressly realized by the sensor according to the invention according to claim 15, so that this sensor can also have the previously cited advantages.

Figure 4A:
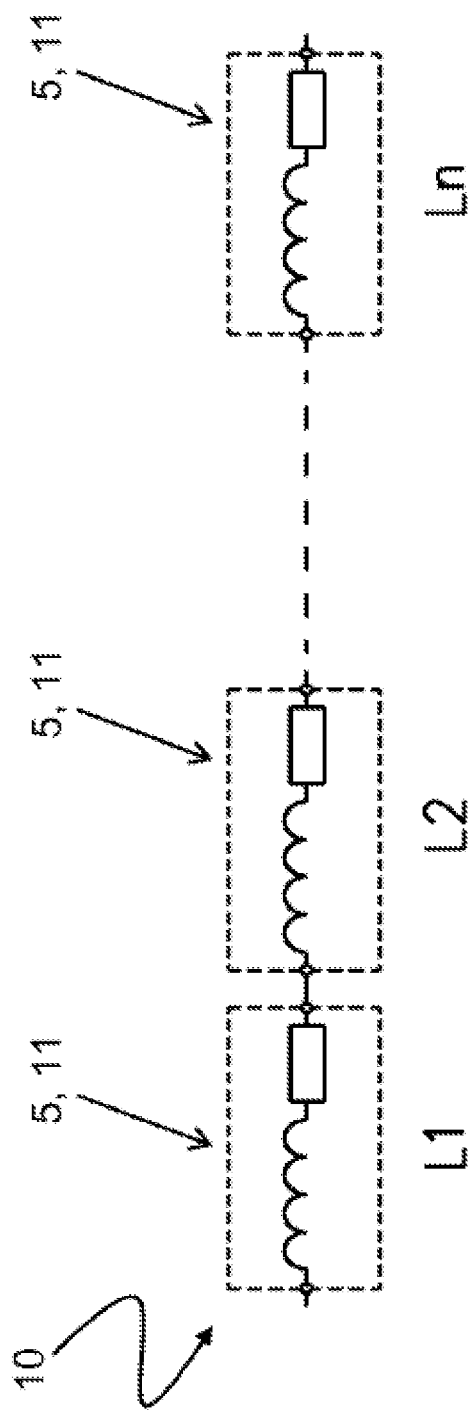
Figure 4B:
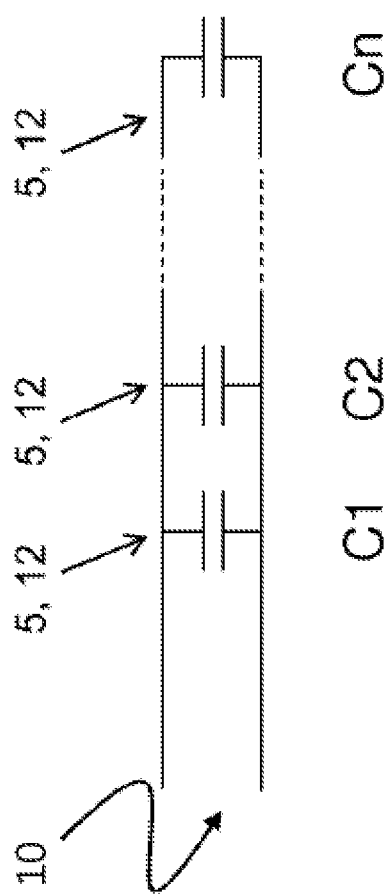
Figure 5:
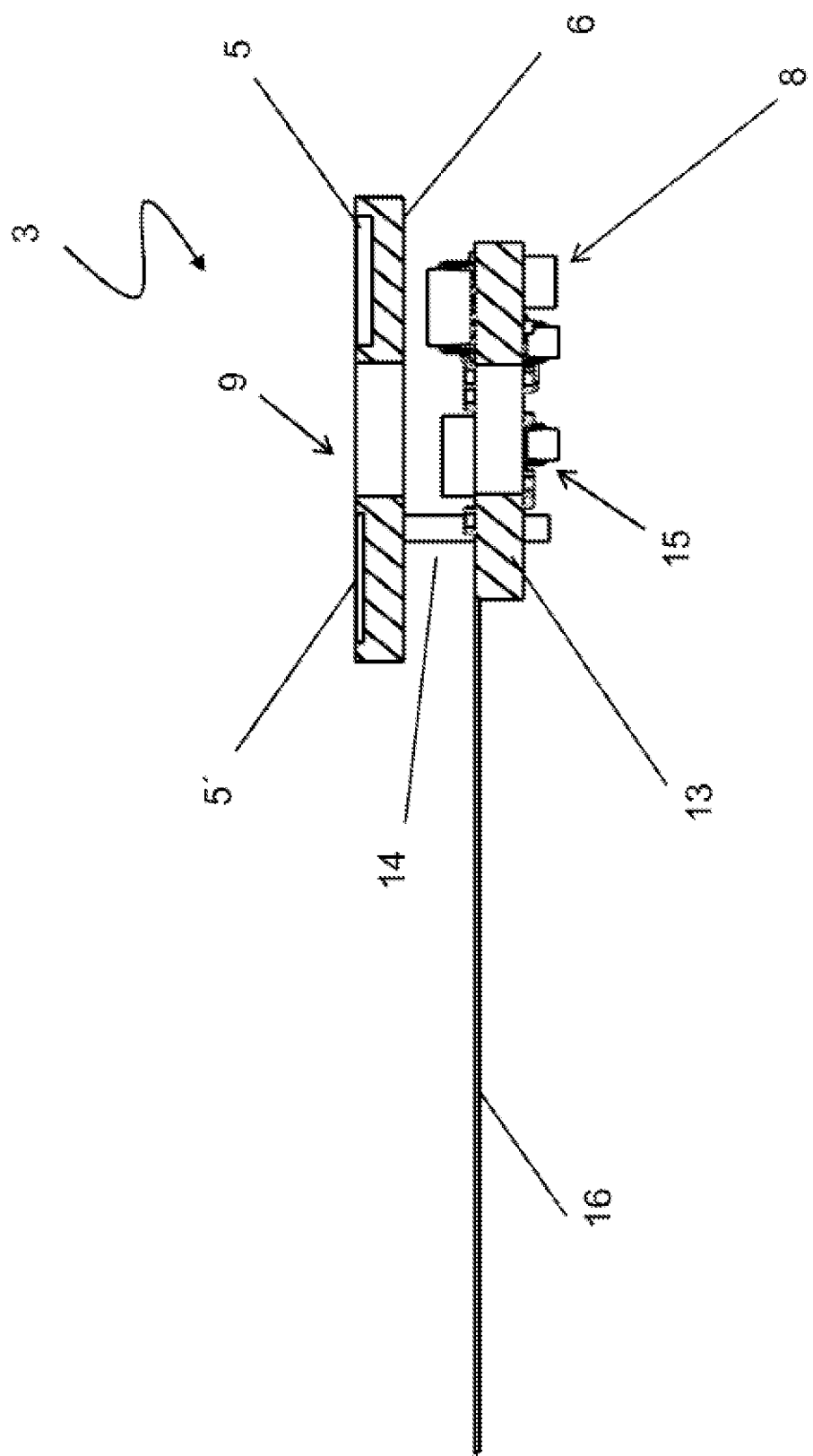
Figure 6:
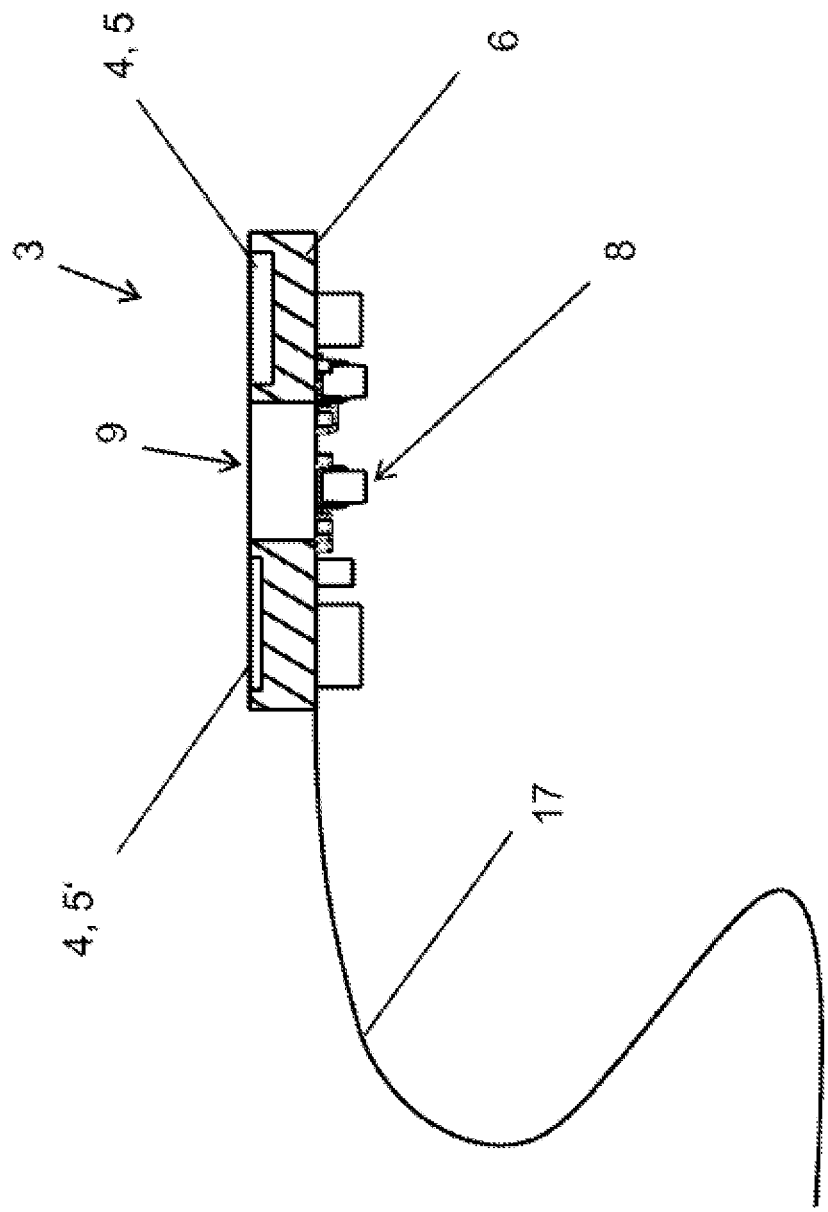

There are now various possibilities for designing and further developing the teaching of the present invention in an advantageous manner. Refer in this regard on the one hand to the claims subordinate to claim 1 and on the other hand to the following explanation of preferred exemplary embodiments of the invention using the drawings. Also, generally preferred embodiments and further developments of the teaching are explained in connection with the explanation of the preferred exemplary embodiments of the invention using the drawings. In the drawings FIG. 1 shows a device known from the prior art for the contactless distance and/or position determination of a measurement object, FIG. 2 shows in a schematic, sectioned lateral view an exemplary embodiment of a device according to the invention comprising a sensor according to the invention, FIG. 3 shows a schematic view of two exemplary embodiments of the measurement device of a sensor according to the invention, FIG. 4a shows a schematic view of an exemplary embodiment of a replacement circuit diagram of a sensor according to the invention, FIG. 4b shows a schematic view of another exemplary embodiment of a replacement circuit diagram of a sensor according to the invention, FIG. 5 shows in a schematic, sectioned lateral view another exemplary embodiment of a sensor according to the invention, FIG. 6 shows in a schematic, sectioned lateral view another exemplary embodiment of a sensor according to the invention, and FIG. 7 shows in a schematic, sectioned lateral view another exemplary embodiment of a device according to the invention in the disassembled and in the assembled state.

FIG. 1 shows a device known from the prior art for the contactless distance and/or position determination of a measurement object 1. The measurement object 1 is produced from an electrically conductive material and arranged on a positioning element 2, for example, a valve rod. The positioning element 2 and therefore the measurement object 1 can move along the sketched-in arrow. A sensor 3 is provided on the side of the positioning element 2 and which measures the distance to the measurement object 1 in a contactless manner. To this end, the sensor 3 comprises a measuring device 4 and/or a measuring element 5 constructed as a coil.

Figure 2:
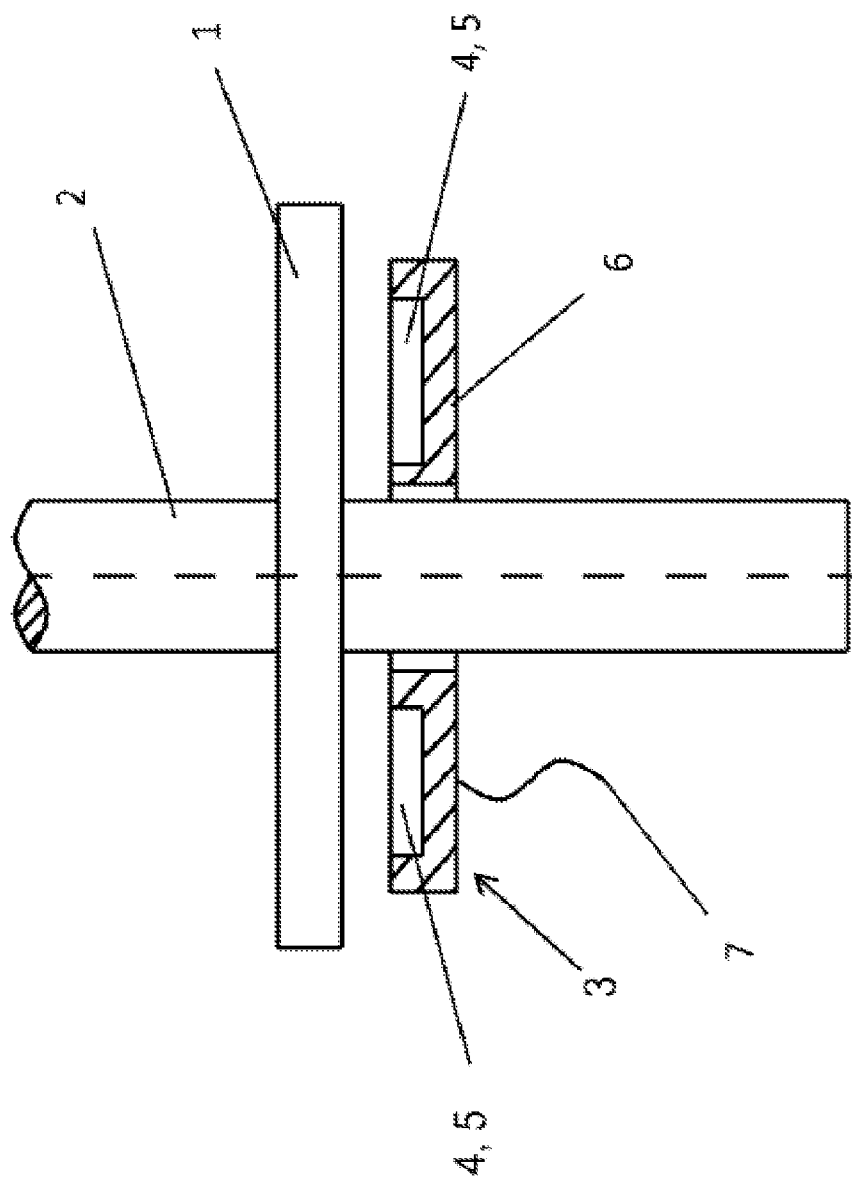

FIG. 2 shows in a schematic, sectioned lateral view an exemplary embodiment of a device according to the invention comprising a sensor 3 according to the invention, A measurement object 1 is provided on the position element 2 and moves with the positioning element 2 in an axial direction. A substrate 6 is arranged opposite the measurement object 1 and contains the measurement elements 5, 5' which jointly form the measurement device 4. The measurement elements 5, 5' are attached to the side facing the measurement object 1. The measurement elements 5, 5' are connected via the electrical connection 7 to the associated evaluation electronics 8. The evaluation electronics 8 is not shown in FIG. 2 for a simplified view.

Figure 3:
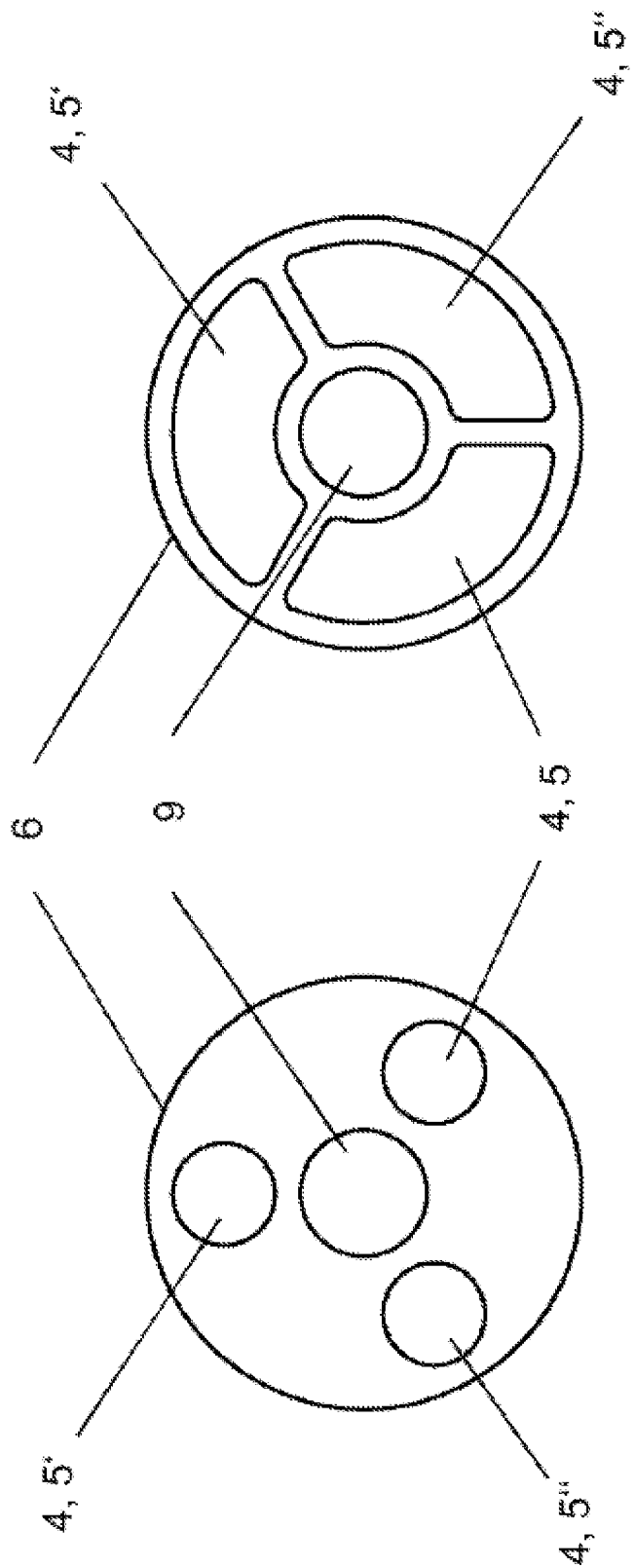

FIG. 3 shows a schematic view of two exemplary embodiments of the measurement device 4 of a sensor 3 according to the invention. Three measurement elements 5, 5', 5" are shown in a top view which are concentrically arranged around a passage 9 in the substrate 6 and jointly form the measurement device 4. The passage 9 serves to receive the positioning element 2. The measurement elements 5, 5', 5" can be (partial) coils of an inductive or eddy current (path) sensor or can be constructed as (partial) electrodes of a capacitive (path) sensor.

FIG. 4a shows a schematic view of an exemplary embodiment of a replacement circuit diagram 10 of a sensor 3 according to the invention. Concretely speaking, the replacement circuit diagram 10 of the measurement elements 5 of an eddy current sensor which are designed as (partial) coils 11 is shown. They are n (partial) coils 11 with inductivity $L_1, \ldots L_n$ in series connection. This yields a total inductivity of $L_{ges}=L_1+L_2+ \ldots +L_n$.

FIG. 4b shows a schematic view of another exemplary embodiment of a replacement circuit diagram 10 of a sensor 3 according to the invention. Concretely speaking, the replacement circuit diagram 10 of the measurement elements 5 of a capacitive sensor 3 is shown. This concerns n (partial) electrodes 12 with capacity $C_1, \ldots C_n$ in parallel connection. This yields a total capacity of $C_{ges} = C_1 + C_2 + \ldots + C_n$.

FIG. 5 shows in a schematic, sectioned lateral view another exemplary embodiment of a sensor 3 according to the invention. The sensor 3 comprises the measurement elements 5, 5' arranged on a substrate 6 as well as comprises the evaluation electronics 8. The evaluation electronics 8 is arranged on a separate substrate 13 and connected to the measurement elements 5, 5' by contact pins 14. Alternatively, instead of the contact pins 14 a flexible conductor can also serve as the electrical connection. The separate substrate 13 for the evaluation electronics 8 also comprises a passage 15 in the middle through which the positioning element 2 (not sketched in) moves in an axial direction. The evaluation electronics 8 is connected by a flexible conductor 16 to the higher-order regulation of the actor.

FIG. 6 shows in a schematic, sectioned lateral view another exemplary embodiment of a sensor 3 according to the invention. The sensor 3 has an especially compact arrangement. The measurement elements 5, 5' and the evaluation electronics 8 are arranged on the same substrate 6. The measurement elements 5, 5' are located on the top with an active connection to the measurement object 1 (not sketched in), whereas the components of the evaluation electronics 8 are provided on the bottom. The supply voltage in the sensor signals are supplied and removed by a line 17.

FIG. 7 shows in a schematic, sectioned lateral view another exemplary embodiment of a device according to the invention in the disassembled and in the assembled state. In the upper view (assembled state) the sensor 3 is positioned with the aid of a corrugated washer 18 in the actor housing 19. The corrugated washer 18 presses the substrate 6 from underneath against a stop 20 (shoulder in the actor housing 19). This compensates mechanical stresses which occur, for example, due to temperature changes.

It is expressly pointed out at this point that the sensor 3 shown in the figures is or can be a part of the device according to the invention in accordance with the claims 1 to 14.

In order to avoid repetitions, refer regarding other advantageous embodiments of the device according to the invention and of the sensor according to the invention to the general part of the specification and to the attached claims Finally, it is expressly pointed out that the previously described exemplary embodiments of the device according to the invention and of the sensor according to the invention serve only to explain the claimed teaching but are not limited to the exemplary embodiments.

LIST OF REFERENCE NUMERALS

1 Measurement object
2 Positioning element
3 Sensor
4 Measurement device
5, 5', 5" Measurement element
6 Substrate
7 Electrical connection
8 Evaluation electronics
9 Passage
10 Replacement circuit diagram
11 (Partial) coils
12 (Partial) electrodes
13 Separate substrate
14 Contact pins
15 Passage
16 Flexible conductor
17 Line
18 Corrugated washer
19 Actor housing
20 Stop

The invention claimed is:

1. A device configured to perform contactless distance and/or position determination of an electrically conductive measurement object, the device comprising:
   a movable object;
   a plate-like substrate having a passage through which the movable object extends; and
   a sensor configured to operate according to the inductive, capacitive or the eddy current principle, wherein the sensor comprises a measurement device that is formed by at least two measurement elements which are spatially separated from each other,
   wherein the measurement elements are configured on the substrate and are positioned such that they are facing the measurement object in an axial direction,
   wherein, during operation, the measurement object, when viewed in an axial direction, is positioned overlapping the measurement device on the movable object or is an integral component of the movable object and is configured to move therewith in the axial direction, and
   wherein the sensor is configured to determine the distance and/or position of the measurement object in the axial direction;
   wherein the measurement elements comprise a) electrodes that are connected in parallel or b) coils that are connected in series.

2. The device according to claim 1, wherein the substrate is configured as a printed circuit board or as a ceramic substrate.

3. The device according to claim 2, further comprising:
   a spring element; and
   an actor housing having a stop,
   wherein the substrate or the sensor is configured to be pressed by the spring element against the stop in the actor housing so that the substrate or the sensor has a fixed position.

4. The device according to claim 2, wherein the substrate is a multilayer ceramic substrate.

5. The device according to claim 1, wherein the movable object is further configured as an actor or a positioning element.

6. The device according to claim 1, wherein the measurement elements are arranged concentrically relative to each other around the passage.

7. The device according to claim 1, wherein the measurement elements are constructed as electrodes or as coils.

8. The device according to claim 1, wherein the measurement elements have a geometry which is round, oval, or polygonal.

9. The device according to claim 1, wherein at least one of the measurement elements is configured to be loaded with a direct voltage that performs temperature compensation or, the device further includes a temperature sensor configured on the substrate.

10. The device according to claim 1, wherein an electronic evaluation device is configured on a back side of the substrate or on a separate substrate.

11. The device according to claim 10, wherein the electronic evaluation device is connected by flexible contact pins to the measurement elements.

12. The device according to claim 10, wherein the electronic evaluation device is connected by flexible conductors to the measurement elements.

13. A sensor configured to perform contactless position determination of an electrically conductive measurement object, the sensor comprising:
- a measurement device that is formed by at least two measurement elements configured on a plate-like substrate which are spatially separated from each other, wherein the measurement elements are positioned such that they are facing the measurement object in an axial direction,
- wherein, during operation, the measurement object, when viewed in an axial direction, is positioned overlapping the measurement device, and
- wherein the sensor is configured to determine the position of the measurement object in an axial direction;
- wherein the measurement elements comprise a) electrodes that are connected in parallel or b) coils that are connected in series.

\* \* \* \* \*